US010293869B2

(12) United States Patent
Kilcline

(10) Patent No.: US 10,293,869 B2
(45) Date of Patent: May 21, 2019

(54) GROUND VEHICLE AIR DATA SYSTEMS AND ASSOCIATED METHODS

(71) Applicant: Peter Kilcline, Bellingham, WA (US)

(72) Inventor: Peter Kilcline, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 128 days.

(21) Appl. No.: 15/638,062

(22) Filed: Jun. 29, 2017

(65) Prior Publication Data

US 2019/0002034 A1    Jan. 3, 2019

(51) Int. Cl.
*B62D 35/00* (2006.01)
*B60T 17/18* (2006.01)
*B60T 8/00* (2006.01)

(52) U.S. Cl.
CPC ............ *B62D 35/001* (2013.01); *B60T 17/18* (2013.01); *B60T 8/00* (2013.01)

(58) Field of Classification Search
CPC .......... B62D 35/001; B60T 17/18; B60T 8/00
See application file for complete search history.

(56) References Cited

U.S. PATENT DOCUMENTS

| 2002/0030384 | A1* | 3/2002 | Basford | B62D 35/001 296/180.1 |
| 2007/0120397 | A1* | 5/2007 | Layfield | B62D 35/001 296/180.4 |
| 2007/0257512 | A1* | 11/2007 | Anderson | B62D 35/00 296/180.1 |
| 2010/0201152 | A1* | 8/2010 | Smith | B62D 35/001 296/180.3 |
| 2014/0292023 | A1* | 10/2014 | Visser | B62D 35/001 296/180.4 |
| 2018/0111648 | A1* | 4/2018 | Amar | B62D 35/001 |

* cited by examiner

*Primary Examiner* — Francis C Gray
(74) *Attorney, Agent, or Firm* — Christensen O'Connor Johnson Kindness PLLC

(57) ABSTRACT

Ground vehicle air data systems, and associated methods are disclosed herein. In one embodiment, a method for determining a drag coefficient of a vehicle includes the steps of: while the vehicle is at rest, opening a valve that connects an air tank with an outside atmosphere; while the vehicle is at rest, closing the valve that connects the air tank with the outside atmosphere; and while the vehicle is in motion, measuring a total pressure with a total pressure probe carried by the vehicle.

20 Claims, 4 Drawing Sheets

GROUND VEHICLE AIR DATA SYSTEMS AND ASSOCIATED METHODS

BACKGROUND

Fuel efficiency is a significant element of the overall economics of a road transportation vehicle, e.g., semi-truck ("tractor") with a trailer. Fuel efficiency of the road vehicles is mostly determined by engine efficiency, rolling resistance of the wheels, stop-and-go traffic (i.e., acceleration and deceleration), drag coefficient, and trailer loading. At relatively high and steady velocity, typically referred to as "highway driving," the air flow drag often dominates energy losses of the vehicle.

Many truck manufacturers measure the drag coefficient and pressure coefficients to characterize and possibly improve the aerodynamics of their vehicles. FIG. 1 illustrates conventional technology for measuring a drag coefficient for a combination of a tractor 10 and a trailer 11 travelling in a direction 40. With the illustrated conventional technology, either the trailer 11 or the tractor 10 is equipped with two probes: a total pressure probe 20 that faces the direction of the travel and a static pressure probe 21 in a close proximity. The pressure probes 20, 21 can be elevated above the tractor/trailer combination into airflow that is less influenced by the presence of the tractor/trailer combination. The probes 20, 21 are typically combined in a Pitot-static probe, where probe 20 measures total (stagnation) pressure of the airflow, i.e., the pressure of the air particle having decelerated to zero velocity at the tip of the probe, and probe 21 measures the local static pressure. The local dynamic pressure ($P_{DYN}$) is then determined by the difference between the total pressure ($P_{TOT}$) sensed at the tip of the probe 20, and the local static pressure ($P_{ST}$) obtained from probe 21, which can be expressed as:

$$P_{DYN} = P_{TOT} - P_{ST} \qquad \text{Eq. (1)}$$

A drag coefficient ($C_D$) of the tractor/trailer combination can be calculated based on knowing $P_{DYN}$ (from $P_{ST}$, $P_{TOT}$), the aerodynamic force, and relevant dimensions of the tractor/trailer combination. However, the accuracy of these calculations depends, among other factors, on the accuracy of the $P_{ST}$ (static pressure) measurement. For accurate calculations, the $P_{ST}$ should correspond to the static pressure of the freestream airflow that is sufficiently far away from the moving object, therefore not being disturbed by the moving truck/trailer combination. With conventional technologies, the static pressure probe 21 is placed at a location on the vehicle that is presumed to have a relatively stable static pressure. However, the probe 21 is still exposed to the fluctuating and non-representative free flow pressure due to, for example, wind conditions and unsteadiness of the flow field around the vehicle. Stated differently, readings of the conventional static pressure probe 21 are still within the "disturbed" airflow around the truck/trailer combination, thus generally not providing an accurate measurement of the freestream static pressure $P_{ST\infty}$. Additionally, the selection of a location for the static pressure probe 21 necessarily introduces a biasing error, because the reading of the probe is generally influenced by its location near the truck/trailer combination while in motion.

The errors in determining the $P_{ST\infty}$ (freestream static pressure) can be eliminated by placing the static pressure probe 21 sufficiently away from the trailer/tractor combination, into the freestream. However, such a placement results in very long and impractical pressure probes 21 making the measurements expensive and cumbersome. Accordingly, there remains a need for accurate and cost-effective determination of the drag coefficient ($C_D$) and pressure coefficients ($C_P$) of the truck/trailer combination.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method for determining a drag coefficient of a vehicle includes, while the vehicle is at rest, opening a valve that connects an air tank with an outside atmosphere; while the vehicle is at rest, closing the valve that connects the air tank with the outside atmosphere; while the vehicle is in motion, measuring a total pressure with a total pressure probe carried by the vehicle; determining a dynamic pressure as a differential pressure between a first pressure measured by the total pressure probe and a second pressure in the air tank; and determining the drag coefficient of the vehicle based on the dynamic pressure.

In one aspect, the air tank includes thermal insulation.

In one aspect, the method also includes measuring a first temperature of air in the air tank while the vehicle is at rest; measuring a second temperature of air in the air tank while the vehicle is in motion; determining a difference between the first temperature and the second temperature; and based on the difference, adjusting a value of the second pressure in the air tank.

In one aspect, adjusting the value of the second pressure in the air tank is based on ideal gas law.

In one aspect, the method also includes, while the vehicle is in motion, measuring a local static pressure at a surface of the vehicle; and determining a difference between the local static pressure and the second pressure in the air tank.

In one aspect, the local static pressure is measured at a plurality of locations at the surface of the vehicle.

In one aspect, the method also includes determining pressure coefficients on the vehicle based on the local static pressure measured at the plurality of locations at the surface of the vehicle.

In one aspect, the second pressure in the air tank is determined by an absolute pressure probe.

In one aspect, determining the differential pressure between the first pressure measured by the total pressure probe and the second pressure in the air tank is performed by a differential pressure probe.

In one embodiment, an air measurement system includes: an air tank configured to be carried by a vehicle; a valve connecting the air tank with outside atmosphere; a total pressure probe extending away from the vehicle in motion; and a differential pressure probe configured to determine a difference between the total pressure of the vehicle in motion and a pressure in the air tank.

In one aspect, the air measurement system also includes a controller for determining a velocity of the vehicle, or an air speed, based on an input from the differential pressure probe.

In one aspect, the air measurement system also includes a temperature probe configured to measure a temperature of air in the air tank.

In one aspect, the input from the differential pressure probe is a first input of the controller, and an input form the temperature probe is a second input of the controller.

In one aspect, the air tank includes a thermal insulation.

In one aspect, the differential pressure probe is a first differential pressure probe. The air measurement system also includes a plurality of local static pressure probes at a surface of the vehicle; and a second differential probe for determining a difference between at least one of the plurality of local static pressure probes and the pressure in the air tank.

In one embodiment, an air measurement system includes: an air tank carried by a vehicle; a valve connecting the air tank with outside atmosphere; means for measuring a total pressure of the vehicle in motion; and a differential pressure probe configured to determine a difference between the total pressure of the vehicle in motion and a pressure in the air tank.

In one aspect, the means for measuring the total pressure include Pitot probe or Kiel probe.

In one embodiment, an air measurement system includes: an absolute pressure probe configured to be carried by a vehicle; a valve connecting outside atmosphere with the absolute pressure probe; a total pressure probe extending away from the vehicle in motion; a differential pressure probe configured to determine a difference between the total pressure of the vehicle in motion and a pressure indicated by the absolute pressure probe.

In one aspect, the valve is open when the vehicle is stationary, and the valve is closed when the vehicle is in motion.

In one aspect, the differential pressure probe is a first differential pressure probe. The system further includes: a plurality of local static pressure probes at a surface of the vehicle; and a second differential probe for determining a difference between the pressure indicated by the absolute pressure probe and at least one of the plurality of local static pressure probes.

DESCRIPTION OF THE DRAWINGS

The foregoing aspects and many of the attendant advantages of the claimed subject matter will become more readily appreciated as the same are understood with reference to the following detailed description, when taken in conjunction with the accompanying drawings, wherein:

DETAILED DESCRIPTION

While illustrative embodiments have been illustrated and described, it will be appreciated that various changes can be made therein without departing from the spirit and scope of the claimed subject matter. Briefly, the inventive technology is directed to improved determination of drag coefficient ($C_D$) and pressure coefficients ($C_P$) of a vehicle (e.g., a tractor/trailer) combination. In some embodiments, the vehicle carries an insulated air tank that is connected by a valve to outside atmosphere. Prior to determining $C_D$ and $C_P$, the valve is opened, and the pressure of air in the air tank becomes the atmospheric pressure. Next, the valve is closed to preserve the atmospheric pressure in the air tank. This pressure in the air tank can be used as a static pressure reference for the subsequent determinations of $C_D$ and $C_P$.

In some embodiments, a total pressure probe (e.g., a Pitot or a Kiel probe) extends away from the vehicle (e.g., several feet above the trailer) into the air stream to measure the total pressure (also referred to as the "stagnation pressure"). Next, the static pressure based on the pressure in the air tank can be subtracted from total pressure obtained by the total pressure probe to obtain a dynamic pressure. The reliance on the static pressure of the air tank provides more accurate estimates of $C_D$ and $C_P$, while avoiding measurement inaccuracies and bias error associated with a conventional placement of the static pressure probe at or close-to the surface of the vehicle.

In some embodiments, the air tank is equipped with a temperature probe. If the temperature of air in the tank changes during the test, the static (atmospheric) pressure in the air tank also changes. Knowing the temperature of the air in the tank, the ideal gas law may be used to correct the static pressure measured in the air tank, and further to recalculate the $C_D$ and $C_P$ to their accurate values.

In some embodiments, an absolute pressure probe may be coupled to the air tank. When the pressure in the air tank becomes equal to the atmospheric pressure (e.g., the valve on the air tank is opened and the vehicle is stationary), the absolute pressure probe may record the static pressure in the air tank. This recorded value of the static pressure can be used for the determination of the dynamic pressure, and for the estimates of the $C_D$ and $C_P$.

Figure 1:
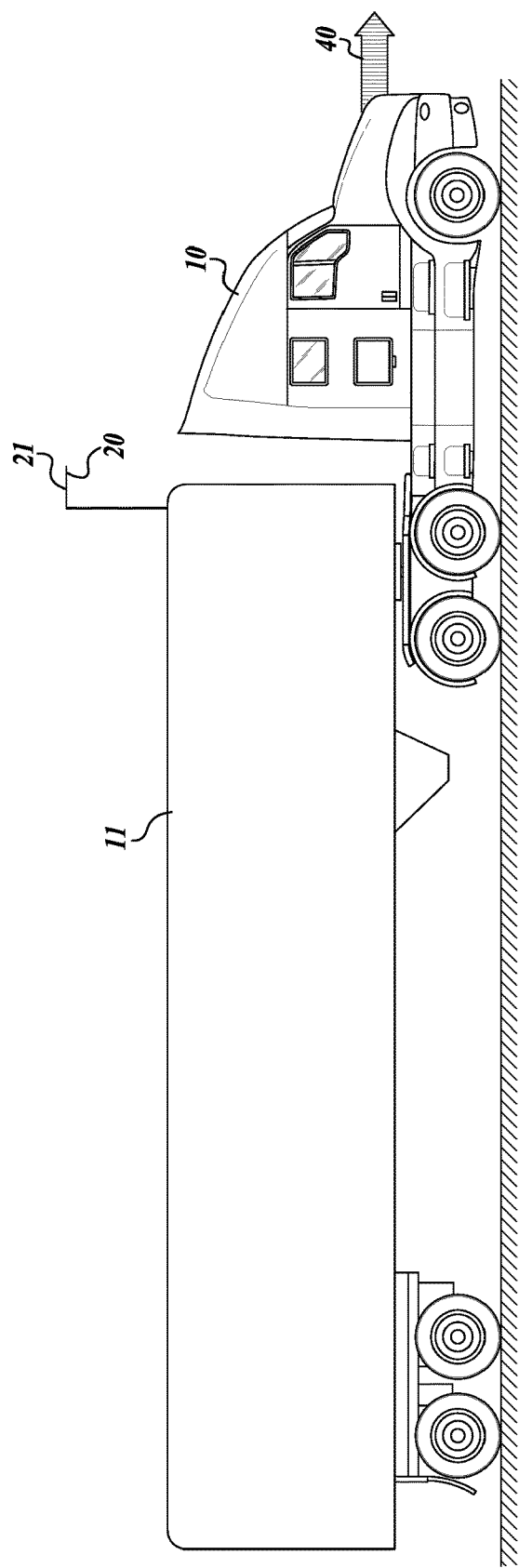
FIG. 1 is a side plan view of a drag coefficient measurement in accordance with conventional technology.
Figure 2:
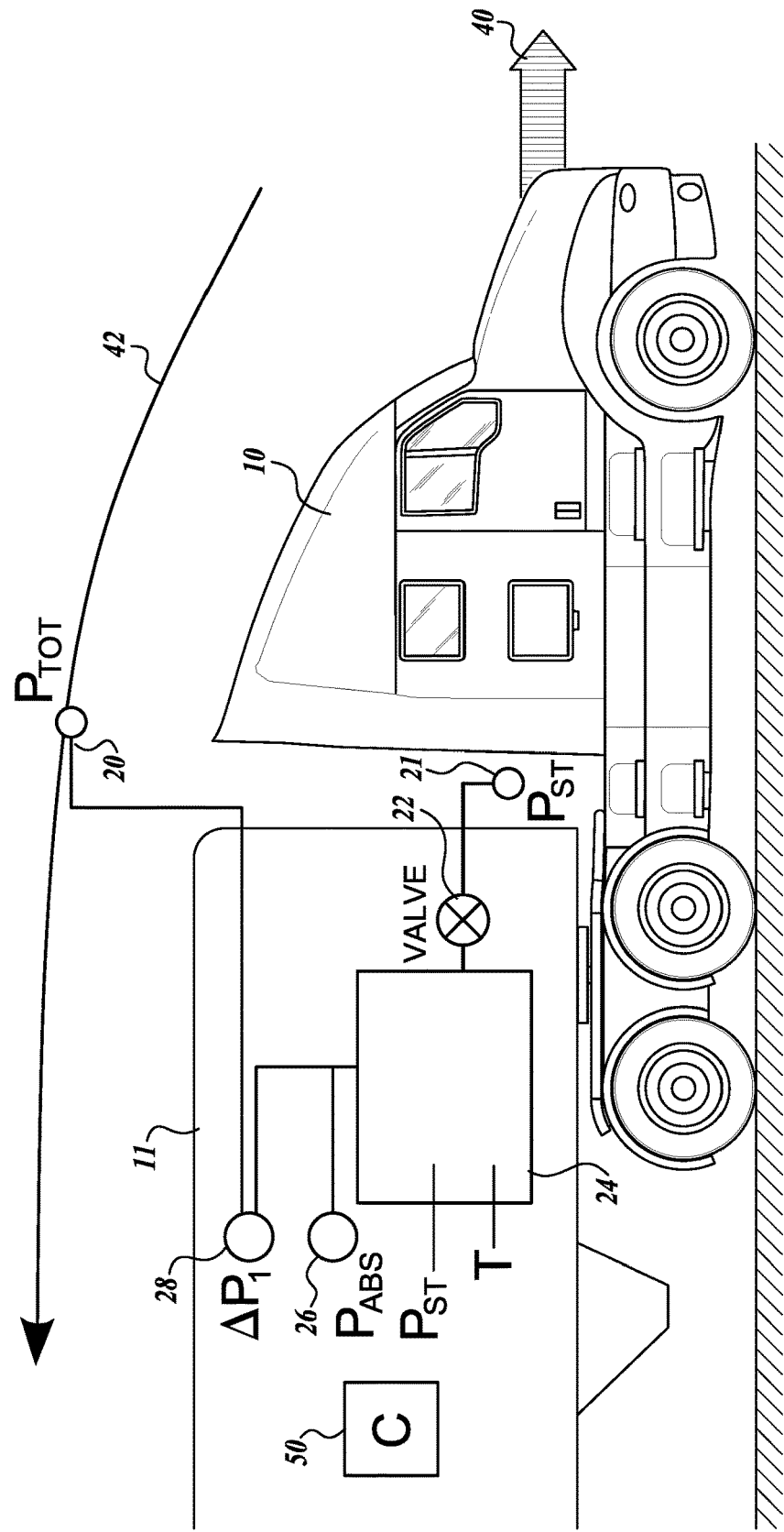
FIG. 2 is a side plan view of a drag coefficient measurement in accordance with an embodiment of the present technology.

FIG. 2 is a side plan view of a drag coefficient measurement in accordance with an embodiment of the present technology. In some embodiments, a truck/trailer combination 10/11 (collectively, a vehicle) carries an air tank 24 that is connected with a valve 22 to an outside atmosphere. When the vehicle is at rest, the atmospheric pressure by definition corresponds to the static pressure $P_{ST\infty}$. Therefore, opening the valve 22 makes the pressure in the air tank 24 also equal to the $P_{ST\infty}$. When the valve 22 is closed, the pressure in the air tank 24 remains $P_{ST\infty}$, provided the temperature of the air in the air tank 24 is not changed.

When the vehicle moves, a total pressure probe 20 can measure the total pressure of the air flow along a streamline 42. Some examples of the total pressure probe 20 are Pitot probe and Kiel probe. As the air particle isentropically decelerates to zero velocity at the tip of the total pressure probe, the total pressure can be expressed as a sum of the freestream static pressure $P_{ST\infty}$ and freestream dynamic pressure $P_{DYN\infty}$, as shown in Eq. (1):

$$P_{TOT} = P_{ST\infty} + P_{DYN\infty} \quad \text{Eq. (1)}$$

$P_{DYN\infty}$ represents a dynamic pressure of a fluid particle, which can also be expressed as:

$$P_{DYN\infty} = \tfrac{1}{2}\rho v_\infty^2 \quad \text{Eq. (2)}$$

where $\rho$ is a density of air (e.g., in kg/m³) and $v_\infty$ is the relative air velocity sufficiently far from the vehicle, by definition the 'freestream' velocity (e.g., in m/s). Therefore, difference between the $P_{TOT}$ and $P_{ST\infty}$ represents $P_{DYN\infty}$. In some embodiments, a differential probe 28 (also referred to as differential sensor 28) can be used to measure a pressure difference ($\Delta P_1$) between the $P_{TOT}$ measured by the total pressure probe 20, and $P_{ST\infty}$ that is represented by the pressure of air in the air tank 24. Therefore, the differential probe 28 measures the $P_{DYN\infty}$.

In some embodiments, the $P_{DYN\infty}$ may be determined as the pressure difference between the total pressure probe 20

($P_{TOT}$) and an absolute pressure probe 26 ($P_{ABS}$). For example, the absolute pressure probe 26 (also referred to as absolute pressure sensor 26) can measure and save the value of the pressure of air in the air tank 24 ($P_{ST\infty}$) before the vehicle starts moving.

Knowing the $P_{DYN\infty}$, relative velocity of air with respect to the tractor/trailer combination can be determined as:

$$v = \sqrt{2P_{DYN\infty}/\rho} \qquad \text{Eq. (3)}$$

In general, the relative velocity of air is the combination of the speed of the tractor/trailer combination and the velocity of wind (e.g., headwind effectively increases the relative velocity of air, while tailwind effectively decreases the relative velocity of air).

Furthermore, knowing the freestream dynamic pressure ($P_{DYN\infty}$), the drag coefficient can be determined as:

$$C_D = = F/P_{DYN\infty}A \qquad \text{Eq. (4)}$$

where A is an aerodynamic cross-section of the truck/trailer combination and F is the drag force that may be determined, for example, based on the output of the truck engine. In at least some embodiments, since the pressure of the air in the air tank 24 corresponds to the value of $P_{ST\infty}$, pressure probe 28 measures $P_{DYN\infty}$, and the drag coefficient $C_D$ can be determined more accurately. In some embodiments, the air tank 24 may be insulated to reduce the temperature fluctuations of the air in the air tank during the measurements.

Figure 3:
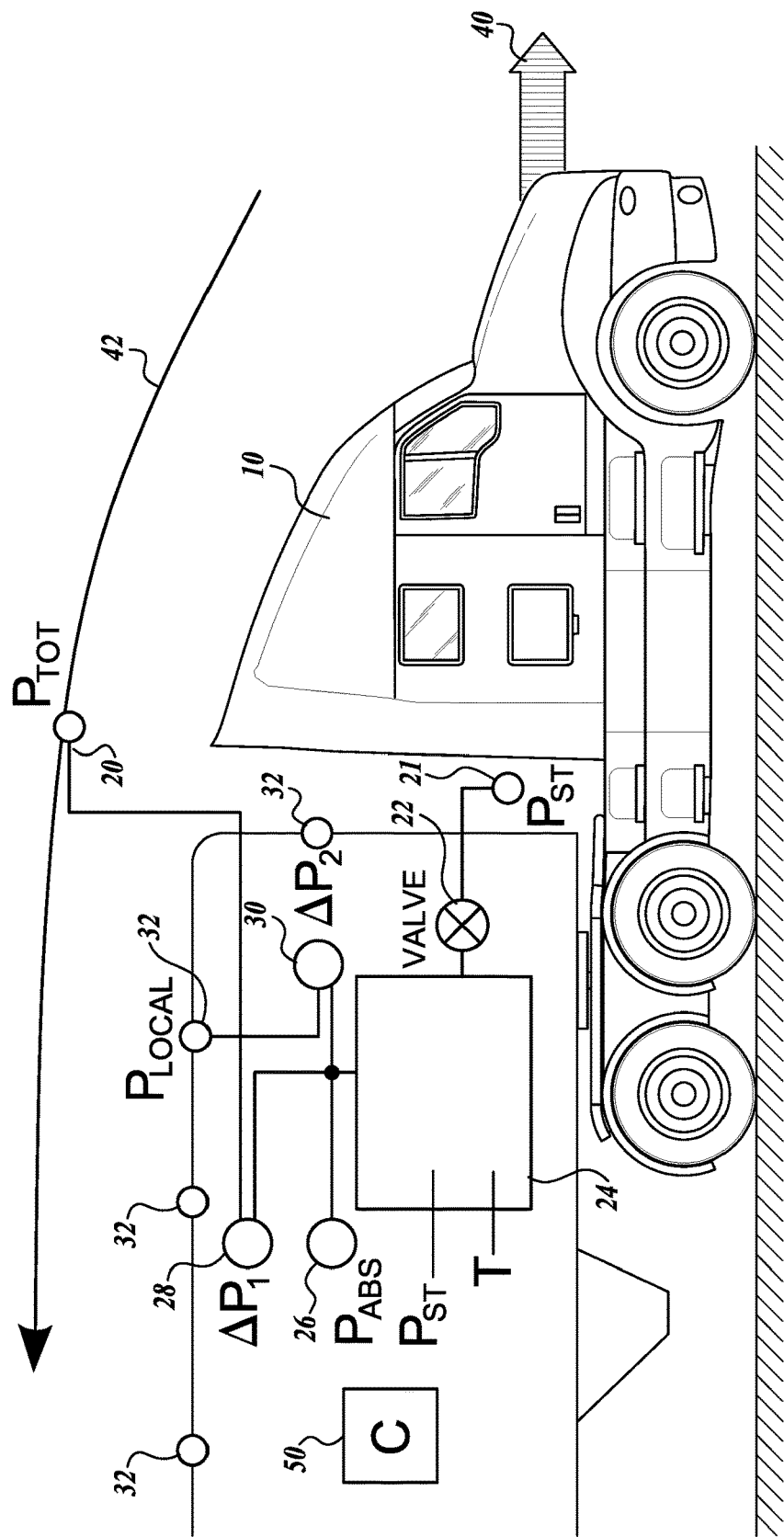
FIG. 3 is a side plan view of a pressure coefficient measurement in accordance with an embodiment of the present technology.

FIG. 3 is a side plan view of a pressure coefficient ($C_P$) measurement in accordance with an embodiment of the present technology. The $C_P$ of the vehicle can be expressed as:

$$C_P = \frac{P - P_{ST\infty}}{\frac{1}{2}rv^{\infty 2}} = (P - P_{ST\infty})/P_{DYN\infty} \qquad \text{Eq. (5)}$$

where P is a local static pressure (also referred to as $P_{LOCAL}$). $P_{LOCAL}$ can be measured by local pressure probes 32 that are distributed at or close to the surface of the vehicle. Therefore, $C_P$ is also a function of the freestream static pressure ($P_{ST\infty}$) of the air. Therefore, the measurements of $C_P$ have similar limitations and inaccuracies as do the measurements of $C_D$.

In some embodiments, a pressure difference ($\Delta P_2$) between the local pressure (P or $P_{LOCAL}$) and the static pressure of air ($P_{ST}$) is determined by a differential pressure probe 30. Since the differential pressure probe 30 is connected with the air tank 24, the $P_{ST}$ is generally an accurate representation of the freestream static pressure of air, $P_{ST\infty}$. In some embodiments, the $P_{ST\infty}$ can be represented by the absolute pressure ($P_{ABS}$) probe 26. As a result, the accuracy of the measurements of $C_P$ is improved.

In some embodiments, a controller 50 (e.g., a microprocessor chip or a computer) may take probe measurements as input to determine $C_P$, $C_D$, or other parameters. In some embodiments, the controller 50 can recalculate $C_P$, $C_D$, or other parameters based on the temperature fluctuations of the air in the air tank 24.

In some embodiments, the static pressure ($P_{ST\infty}$) may be measured by a stationary road-side static pressure probe. These measurements of $P_{ST\infty}$ may be wirelessly transmitted to the controller 50 to be used for the determination of $C_P$ and $C_D$. For example, the controller 50 may assign the received value of $P_{ST\infty}$ to the absolute pressure probe 26 for the subsequent determination of $C_P$ and/or $C_D$ based on $P_{ABS}$.

Figure 4:
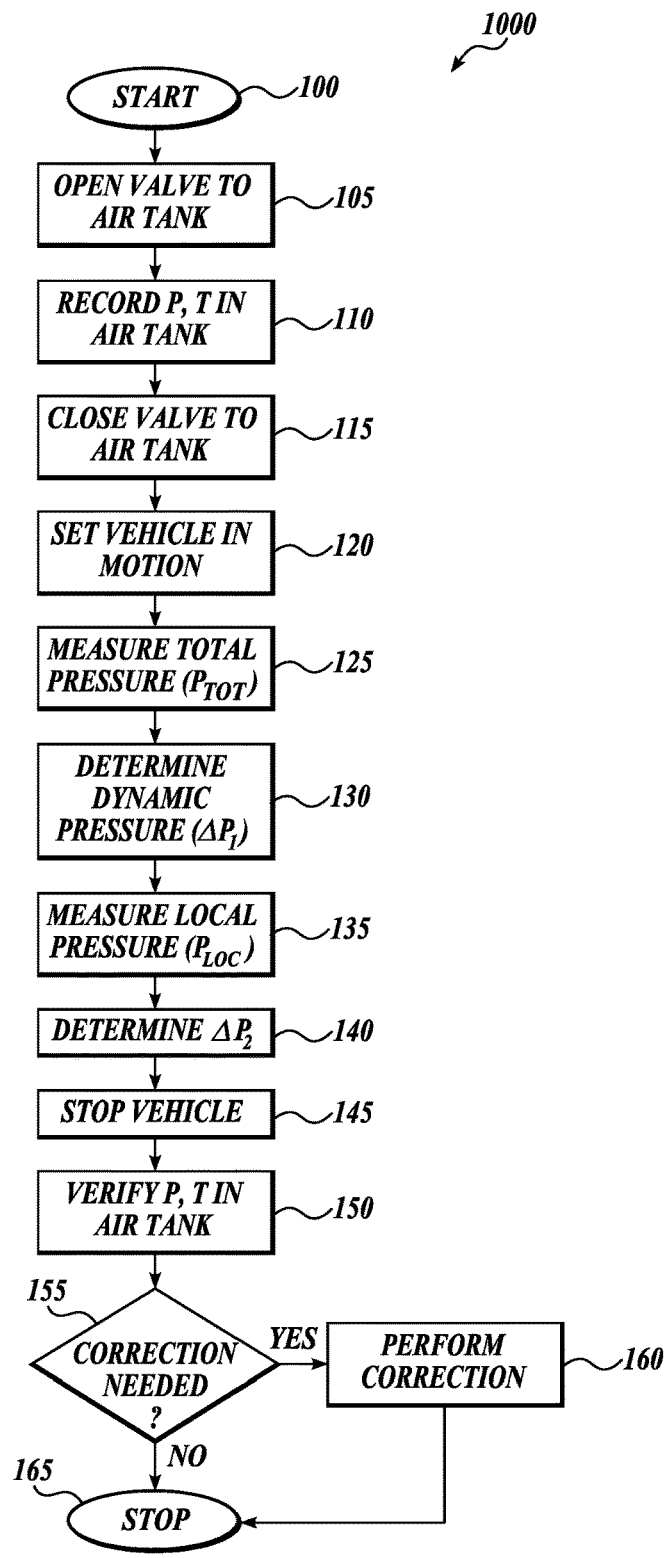
FIG. 4 is a flowchart of a method for determining drag coefficient and pressure coefficients in accordance with an embodiment of the present technology.

FIG. 4 is a flowchart of a method 1000 for determining drag coefficient and pressure coefficients in accordance with an embodiment of the present technology. In some embodiments, the method may include additional steps or may be practiced without all steps illustrated in the flow chart.

The method starts in step 100, and continues to step 105. In step 105, the valve is opened to connect the air tank with the outside atmosphere. Therefore, the pressure of air in the air tank becomes equal-to or at least close-to the static pressure of the atmosphere.

In step 110, pressure ($P_{ST\infty}$) and temperature (T) of the air in the air tank may get recorded. For example, $P_{ST\infty}$ may be recorded by the absolute pressure probe 26, and T may be recorded by the controller 50.

In step 115, the valve is closed. As a result, air in the air tank remains at the atmospheric pressure.

In step 120, the vehicle (e.g., tractor/trailer combination) starts moving. However, the pressure of air in the air tank is still the atmospheric pressure, i.e., the static pressure of the surrounding air.

In step 125, the total pressure can be measured using a probe that is positioned sufficiently away from the moving vehicle as to reduce the influence of the moving vehicle on the free flow. In some embodiments, Pitot or Kiel probes may be used.

In step 130, the freestream dynamic pressure ($\Delta P_1$) is determined by subtracting the freestream static pressure ($P_{ST\infty}$) from the total pressure ($P_{TOT}$). In some embodiments, the freestream static pressure is determined as the pressure of air in the air tank 24. In some embodiments, the freestream static pressure may be determined as the pressure reading recorded by the absolute pressure probe 26 ($P_{ABS}$). The value of the drag coefficient ($C_D$) can be determined using Equation (4).

In step 135, local pressure ($P_{LOC}$) is measured. In some embodiments, the local pressure is measured by a plurality of pressure probes at or close to the surface of the moving vehicle.

In step 140, a difference $\Delta P_2$ between the local pressure ($P_{LOC}$) and the freestream static pressure ($P_{ST\infty}$) is determined as, for example, differential pressure between the readings of the local pressure probes 32 and the pressure in the air tank 24. The value of the pressure coefficient ($C_P$) can be determined using Equation (5).

In step 145, the vehicle is stopped. In step 150, pressure and temperature in the air tank 24 is verified to find whether the pressure/temperature changed during the test. In some embodiments, this verification may be performed automatically by a controller.

In step 155, a determination is made whether the results (e.g., $C_D$, $C_P$) should be corrected because pressure/temperature changed in the air tank during the test. If the correction is needed, the method proceeds to step 160 to perform the required correction. In some embodiments, steps 155 and/or 160 may be executed by the controller 50. The method ends in step 165.

Many embodiments of the technology described above may take the form of computer-executable or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The embodiments of the invention in which an exclusive property or privilege is claimed are defined as follows:

1. A method for determining a drag coefficient of a vehicle, comprising:
   while the vehicle is at rest, opening a valve that connects an air tank with an outside atmosphere;
   while the vehicle is at rest, closing the valve that connects the air tank with the outside atmosphere;
   while the vehicle is in motion, measuring a total pressure with a total pressure probe carried by the vehicle;
   determining a dynamic pressure as a differential pressure between a first pressure measured by the total pressure probe and a second pressure in the air tank; and
   determining the drag coefficient of the vehicle based on the dynamic pressure.

2. The method of claim 1, wherein the air tank includes thermal insulation.

3. The method of claim 1, further comprising:
   measuring a first temperature of air in the air tank while the vehicle is at rest;
   measuring a second temperature of air in the air tank while the vehicle is in motion;
   determining a difference between the first temperature and the second temperature; and
   based on the difference, adjusting a value of the second pressure in the air tank.

4. The method of claim 3, wherein adjusting the value of the second pressure in the air tank is based on ideal gas law.

5. The method of claim 1, further comprising:
   while the vehicle is in motion, measuring a local static pressure at a surface of the vehicle; and
   determining a difference between the local static pressure and the second pressure in the air tank.

6. The method of claim 5, wherein the local static pressure is measured at a plurality of locations at the surface of the vehicle.

7. The method of claim 6, further comprising:
   determining pressure coefficients on the vehicle based on the local static pressure measured at the plurality of locations at the surface of the vehicle.

8. The method of claim 1, wherein the second pressure in the air tank is determined by an absolute pressure probe.

9. The method of claim 1, wherein determining the differential pressure between the first pressure measured by the total pressure probe and the second pressure in the air tank is performed by a differential pressure probe.

10. An air measurement system, comprising:
    an air tank configured to be carried by a vehicle;
    a valve connecting the air tank with outside atmosphere;
    a total pressure probe extending away from the vehicle in motion; and
    a differential pressure probe configured to determine a difference between the total pressure of the vehicle in motion and a pressure in the air tank.

11. The system of claim 10, further comprising:
    a controller configured to determine a velocity of the vehicle, or an air speed, based on an input from the differential pressure probe.

12. The system of claim 11, further comprising:
    a temperature probe configured to measure a temperature of air in the air tank.

13. The system of claim 12, wherein the input from the differential pressure probe is a first input of the controller, and wherein an input from the temperature probe is a second input of the controller.

14. The system of claim 10, wherein the air tank includes a thermal insulation.

15. The system of claim 10, wherein the differential pressure probe is a first differential pressure probe, the system further comprising:
    a plurality of local static pressure probes at a surface of the vehicle; and
    a second differential probe configured to determine a difference between at least one of the plurality of local static pressure probes and the pressure in the air tank.

16. An air measurement system, comprising:
    an air tank configured to be carried by a vehicle;
    a valve connecting the air tank with outside atmosphere;
    means for measuring a total pressure of the vehicle in motion; and
    a differential pressure probe configured to determine a difference between the total pressure of the vehicle in motion and a pressure in the air tank.

17. The system of claim 16, wherein the means for measuring the total pressure include Pitot probe or Kiel probe.

18. An air measurement system, comprising:
    an absolute pressure probe configured to be carried by a vehicle;
    a valve connecting outside atmosphere with the absolute pressure probe;
    a total pressure probe extending away from the vehicle in motion; and
    a differential pressure probe configured to determine a difference between the total pressure of the vehicle in motion and a pressure indicated by the absolute pressure probe.

19. The system of claim 18, wherein the valve is open when the vehicle is stationary, and the valve is closed when the vehicle is in motion.

20. The system of claim 18, wherein the differential pressure probe is a first differential pressure probe, the system further comprising:
    a plurality of local static pressure probes at a surface of the vehicle; and
    a second differential probe configured to determine a difference between the pressure indicated by the absolute pressure probe and at least one of the plurality of local static pressure probes.

* * * * *